United States Patent [19]
Thoma et al.

[11] 3,850,038
[45] Nov. 26, 1974

[54] BI-MATERIAL CONDITION SENSORS

[75] Inventors: Paul E. Thoma, Burlington; Louis D. Atkinson, New Berlin, both of Wis.

[73] Assignee: Johnson Service Company, Milwaukee, Wis.

[22] Filed: Oct. 11, 1972

[21] Appl. No.: 296,668

[52] U.S. Cl. .............................................. 73/363.5
[51] Int. Cl. ............................................. G01k 5/68
[58] Field of Search ..... 73/363.5, 363.3, 337, 378.3

[56] References Cited
UNITED STATES PATENTS

| | | | |
|---|---|---|---|
| 1,681,911 | 8/1928 | Spencer | 73/363.5 |
| 2,361,193 | 10/1944 | Gray | 73/378.3 |
| 3,665,765 | 5/1972 | Dube et al. | 73/337 |

*Primary Examiner*—Richard C. Queisser
*Assistant Examiner*—Denis E. Corr
*Attorney, Agent, or Firm*—Andrus, Sceales, Starke & Sawall

[57] ABSTRACT

A bi-material sensing element is essentially rigidly mounted about the periphery. The element is mounted in an environment to sense the humidity, temperature or the like and is to provide a detectable movement normal to the plane of the element. Holes or slots of a predetermined shape are formed in the element and are equicircumferentially distributed about the center. At a critical diameter, the unit has zero sensitivity. The sensitivity of the element will increase when the holes are moved to either side of the critical diameter, with the deflection in opposite directions as the holes are located to opposite sides of the critical diameter. The sensitivity also increases with increased ratio of voids to solid material along the circle diameter on which the holes are located. The critical diameter location varies with the several factors involved in the construction of the bi-material disc.

17 Claims, 8 Drawing Figures

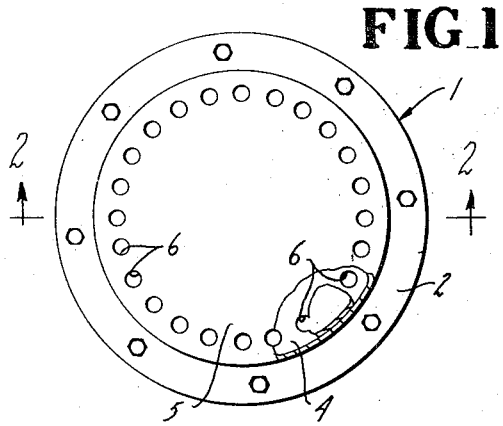
FIG.1
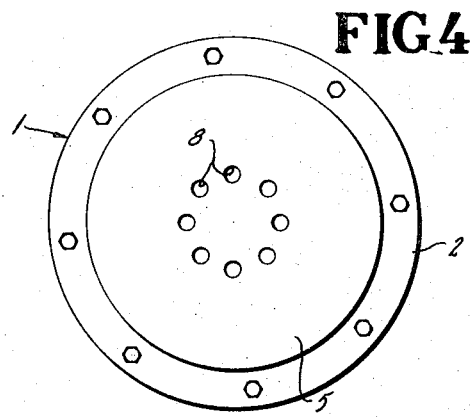
FIG.4
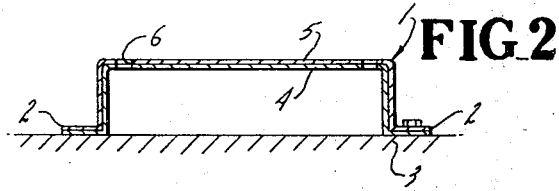
FIG.2
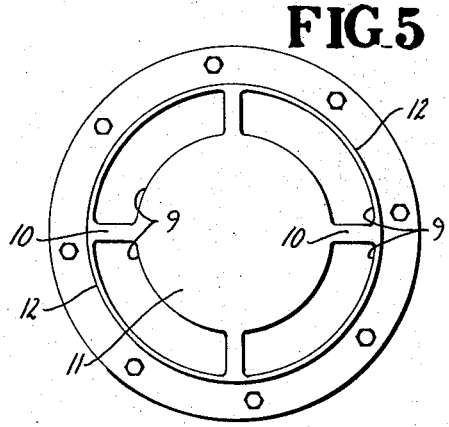
FIG.5
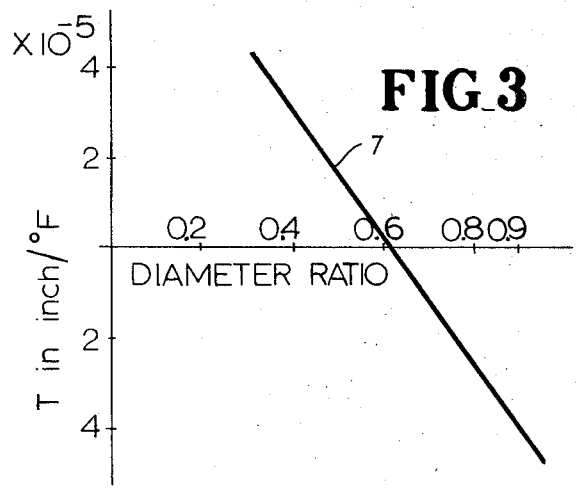
FIG.3
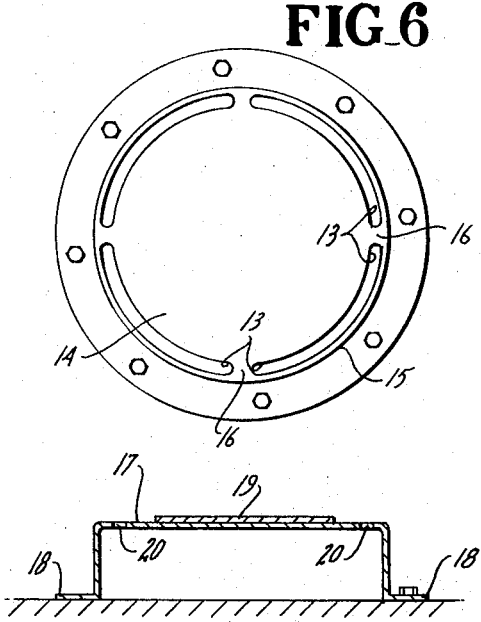
FIG.6
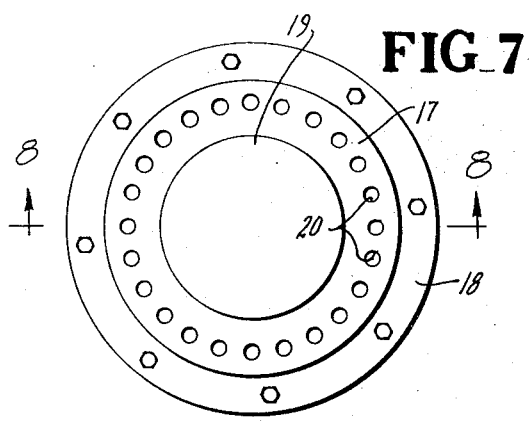
FIG.7
FIG.8

BI-MATERIAL CONDITION SENSORS

BACKGROUND OF THE INVENTION

This invention relates to a bi-material sensor and particularly to a bi-material sensor which is essentially rigidly mounted at spaced locations with the deflection intermediate of the spaced mounting.

Environmental control systems and the like often employ bi-material sensing devices for detecting temperature or humidity conditions and generating an appropriate control or indicating signal. Cantilevered bi-material elements, snap action disc elements and the like have been widely employed. Cantilevered bi-material elements are fixed or rigidly mounted at one end and have a proportional outer end deflection as a function of temperature and/or relative humidity. Such elements are often used in adjustable thermostats and humidistats, respectively. Simply supported circular discs, however, are generally designed for use in snap action applications where as the circular disc is deformed, the outer edge is allowed to pivot within a V-shaped type slot support. A particularly satisfactory sensing device is shown in U.S. Pat. No. 3,665,765 which issued to Paul E. Thoma as of May 30, 1972. As more fully disclosed therein, a bi-material sensing disc element includes a flexible metal base member to which a second material is bonded. The second material is made of a significantly smaller area than that of the base member which is rigidly mounted at the periphery. Thus, the sensor can be formed as a cup-shaped member with the peripheral edge rigidly mounted by a suitable flange member or the like, or as a flat disc which is correspondingly mounted at opposite peripheral locations or completely about the periphery. The differential bi-material areas produce a significant deflection with humidity or temperature. This structure provides an essentially rigid or semi-rigid mounting of a disc-like element with significant deflection for proportional response.

SUMMARY OF THE PRESENT INVENTION

The present invention is particularly directed to a rigid or semi-rigidly held bi-material condition sensing platelike element which will also create a practically significant central deflection and thus provide an alternative construction to that disclosed in the previously referred to U.S. Pat. No. 3,665,765. Generally in accordance with the present invention, the condition sensing element is formed as or with a planar flexible base member to which a second material is secured, preferably by a total interface bond. Opening means are formed in the bi-material structure in spaced relation to the mounting and to the center with the result that a significant and practically detectable deflection is obtained with changes in environmental condition. Although the sensitivity is dependent upon a number of factors, such as the elastic modulus of the layers, the thickness of the layers, the coefficient of expansion of the particular materials and the overall dimensions of the systems and the like, the location, configuration and relative size of the opening means significantly contribute to the characteristic of the sensor. Thus, the present invention is distinguished from the prior art particularly in providing an essentially rigidly held condition sensor with the presence and location of the opening means establishing and controlling the sensitivity. The location of the opening means will also control the direction of deflection. Further, the concept applied to the differential area sensors of U.S. Pat. No. 3,665,765 increases its sensitivity.

In a preferred construction, the bi-material sensor is generally a disc-like element which may be a simple flat disc which is rigidly held about the periphery or may be a cup-shaped member having a depending side wall and an edge flange for mounting of the sensor in a rigid or semi-rigid construction. Holes and slots of a predetermined shape are formed in the bimaterial base portion and in an equicircumferentially distributed arrangement or configuration. The holes may be round, circumferentially elongated slots, eliptical or the like. For a given material system, zero sensitivity results with openings placed at a certain circle diameter. This may be defined by a critical diameter ratio equal to the zero sensitivity circle diameter on which the equally spaced openings are located divided by the diameter of the cup or of the base. The sensitivity of the element will increase when the diameter ratio is either greater or less than the critical diameter ratio, with deflection in opposite directions as the ratio varies therefrom. The critical diameter ratio is not a fixed value for all units but varies with the various other factors involved in the bi-material construction.

This invention thus provides another means of producing deflection in essentially rigidly held disc-like elements as well as improving the sensitivity of the prior art.

BRIEF DESCRIPTION OF THE DRAWING

The drawing furnished herewith illustrates preferred constructions of the present invention in which the above advantages and features are clearly disclosed as well as others which will be readily understood from the following description of such illustrated embodiments.

In the drawing:

FIG. 1 is a top view of a bi-material environmental condition sensing unit constructed in accordance with the present invention;

FIG. 2 is a vertical section taken generally on line 2—2 of FIG. 1;

FIG. 3 is a graphical illustration of a temperature sensitive bi-material sensor constructed in accordance with the present invention as shown in FIGS. 1 and 2;

FIG. 4 is a plan view similar to FIG. 1 illustrating a modification to reverse the direction of deflection;

FIGS. 5 and 6 illustrate alternative constructions;

FIG. 7 is a plan view of a differential area bimaterial sensor incorporating the present invention; and FIG. 8 is a vertical cross-section taken generally on line 8—8 of FIG. 7.

DESCRIPTION OF ILLUSTRATED EMBODIMENT

Referring to the drawing and particularly to FIGS. 1 and 2, a bi-material sensor is illustrated which by proper selection of material can be employed to sense temperature or humidity in accordance with the teaching of the present invention. The construction is hereinafter described in connection with temperature sensitive materials with a graphical illustration of the output of the characteristics shown in FIG. 3.

The illustrated sensor includes a cylindrical supporting shell 1 which is generally a cup-shaped member having a mounting flange 2 integrally formed with the peripheral edge of the shell. The illustrated flange 2 is apertured and the sensor is bolted or otherwise rigidly secured to a support 3 within the environment to be sensed. The cylindrical shell 1 is formed of a material which has a selected coefficient of temperature expansion with respect to the temperature conditions to be sensed. It is particularly constructed with a planar base 4 of a selected radius and integrally formed with the depending side wall. A second material layer or coating 5 is applied in superimposed relationship to the shell 1 and particularly the base 4. The second material 5 is also a temperature sensitive material but selected with a substantially different coefficient of expansion than that of the base 4. The second material or layer 5 may be a completely separate fabricated member telescoped over the first member and preferably suitably bonded thereto throughout the inner face with the supporting shell 1. Alternatively, it may, of course, be deposited as a coating or secured by separate means such as rivets or the like. Further, although shown as completely of telescoped and conforming configurations including an interconnected side wall, it is merely the outer base portion of the supporting shell 1 which functions as the bi-material sensing element as such and thus consequently the second material 5 can be restricted to such base 4.

In accordance with the teaching of the present invention, the sensor includes a plurality of openings 6 which are preferably equicircumferentially distributed in the base 4 and the overlying second material layer 5. It is the introduction of openings 6 into the deflecting portion in spaced relation to the mounted edge and the center which results in a practically detectable deflection of the bi-material base element and thus results in a bi-material sensor with a rigid or semi-rigid fixed mounting which is referred to herein generically as an essentially rigid mounting. The direction and the sensitivity varies with the particular location of the openings and in particular the ratio of the diameter of the hole circle and the diameter of the base or disc element 4.

FIG. 3 is a graphical illustration of temperature sensitivity versus the diameter ratio of a sensor such as shown in FIGS. 1 and 2 but selected with equal void and solid material along a circle passing through the center of the holes 6. The diameter ratio is shown on the X or horizontal axis and the temperature sensitivity is shown on the vertical or Y axis. The temperature sensitivity is the deflection in inches per degree Fahrenheit, the scale being 10 to the minus 5. In the test structure, an outer Invar layer 5 and an inner manganese alloy layer 4 were used with a rigid peripheral mounting. The cup member was formed of a diameter of two inches and the bimetal base thickness was 0.010 inch. In the construction of the device resulting in the characteristic of FIG. 3, equicircumferentially distributed openings of 0.125 inch diameter were used.

For the curve 7 shown in FIG. 3, the zero sensitivity occurs at the diameter ratio of essentially 0.61. As the diameter ratio increases, the deflection of the center of the base 4 and the material 5 is downward and at an increasing rate, i.e., with a greater sensitivity. Thus, at approximately a diameter ratio of 0.90, which is shown in FIGS. 1 and 2 as created by 24 openings, a temperature sensitivity of essentially $4.2 \times 10^{-5}$ inch per degree Fahrenheit is obtained.

As the diameter ratio decreases, the deflection is in the opposite direction and with an increasing sensitivity with decreasing diameter ratio. Thus, in FIG. 4 a sensor corresponding to that of FIGS. 1 and 2 is shown except that openings 8 are located inwardly of the critical diameter ratio, and in particular, at a ratio of approximately 0.32 the sensitivity is $4 \times 10^{-5}$ inch per degree Fahrenheit. In FIG. 4, eight equally spaced holes each of 0.125 inch diameter are employed.

The location of the openings thus determines the sensitivity and the direction of deflection with the characteristic for the above described embodiments being linear. In addition, increasing the amount of void space away from the zero sensitivity circle increases the sensitivity of the sensor. The reverse is also true.

The critical diameter ratio at which zero output or sensitivity is obtained is not a fixed value for all constructions. Rather, the ratio will depend upon a number of factors including the layer materials, the elastic modulus of the layers and the particular configuration of the layers.

The output characteristic can be widely varied and controlled by controlling any one or more of the above factors. The basic characteristic of the condition sensor of the present invention which distinguishes it from all other types of rigid or essentially rigidly held sensors is the use of the opening means in the sensor to obtain detectable deflection and to control the characteristic sensitivity of the sensor. Any other opening configuration can, of course, be employed. For example, circumferential slotted temperature sensitive elements have been constructed such as shown in FIGS. 5 and 6. Thus, in FIG. 5, relatively large circumferential openings 9 are provided with relatively long integral arms 10 interconnecting the central portion 11 directly to the side wall 12. Similarly, FIG. 6 employs circumferential slots or openings 13 to define an essentially elongated circumferential slot with the central portion 14 interconnected to the outer portion 15 by relatively small arm portions 16.

As previously discussed, the present invention can also advantageously be applied to the differential area sensor of U.S. Pat. No. 3,665,765 and an illustration of such an embodiment is shown in FIGS. 7 and 8. In this embodiment, a bi-material cup-shaped shell or base member 17 which defines a first material layer having a first predetermined coefficient of expansion is illustrated rigidly mounted upon a suitable flange 18. A second material layer or coating 19 is applied to the center of the base of the shell 17 with its periphery radially spaced inwardly of the side wall and rigid mounting of the shell, as disclosed in U.S. Pat. No. 3,665,765. In accordance with the teaching of the present invention, a series of equicircumferentially spaced openings or holes 20 are located in the shell base immediately outwardly of the second material layer 19. The location and placement of the holes 20, or such other openings as are designed and selected, in the monolayer section of the element, increases its condition response or sensitivity.

The same concept can be applied, of course, to other constructions such as shown in U.S. Pat. No. 3,665,765, with the openings appropriately located to modify the basic characteristics of such unit. Although a disc-like construction is illustrated, the present invention can also be readily applied to any other suitable configuration employing a relatively fixed mounting or rigid mounting. Thus, a flat plate-like bi-material strip may be held at the opposite ends of the strip to define an essentially rigid mounting of the element. Openings in the strip will result in the central portion moving with a detectable deflection.

Further, although particularly described for temperature sensing, the invention can be equally applied to bi-material humidity condition sensitive units such as shown in U.S. Pat. No. 3,665,765. Where the second layer is bonded to the base, particularly satisfactory materials of synthetic compositions sensitive to humidity conditions are disclosed in U.S. Pat. Nos. 3,301,057 and 3,461,723.

The present invention thus provides a sensor permitting rigid or semi-rigid mounting of the sensor means to control the sensitivity and characteristics of the unit in a simple reliable manner.

Various modes of carrying out the invention are contemplated as being within the scope of the following claims, particularly pointing out and distinctly claiming the subject matter which is regarded as the invention.

We claim:

1. A bi-material condition sensing element having integral inner and outer portions and at least a pair of outer mounting means for establishing a detectable deflection in accordance with a sensed condition, said element including superimposed materials with different coefficients of expansion with respect to a selected condition and said mounting means being spaced from each other about the outer portion and said mounting means being adapted to be essentially rigidly mounted, comprising the improvement of a plurality of separate opening means located within said element and within at least one of said materials with said material completely surrounding each opening means, said opening means being located in spaced relation to said mounting means and in spaced relation to each other, said opening means establishing and controlling the deflection characteristic of the element to said sensed condition.

2. The bi-material condition sensing element of claim 1 wherein said superimposed materials are coextensive and having peripheral mounting means, said plurality of separate opening means being located equicircumferentially on a common circle.

3. The bi-material condition sensing element of claim 1 wherein a first of said superimposed materials is secured to substantially less than the total area of a second of said materials and is concentrically applied thereto to define a substantially planar bi-material element with said second material having a substantially uncovered portion defining a mono-layer, said opening means being located in the mono-layer.

4. The bi-material condition sensing element of claim 3 wherein said plurality of separate opening means are located on a common circle and are equicircumferentially spaced on said circle.

5. The bi-material condition sensing element of claim 1 wherein said element is a flat, plate-like element having a center and said opening means includes a plurality of equicircumferentially distributed similar openings located on a common circle in spaced relation to the mounting means and the center of the element, said opening means defining a certain ratio of solid material and voids on a diameter through the center of the openings.

6. The bi-material condition sensing element of claim 1 being a generally flat, plate-like element with another peripheral edge and a center and wherein said mounting means is secured to said peripheral edge and said opening means are located on a circle and sized to define a selected ratio of void to solid material along said circle, said element having a zero sensitivity to said condition with said openings located at a particular located circle spaced between the mounting means and the center of the element, said deflection being in opposite directions as said diameter location varies to the opposite side of said zero condition sensitivity diameter location.

7. A bi-material condition sensing apparatus for establishing a detectable deflection in accordance with a sensed condition, a base member defining a first material layer having a first predetermined coefficient of expansion with respect to the condition being sensed, a second material layer having a selected different coefficient of expansion with respect to said condition and interconnected to said first material layer to define a bi-material sensing element, essentially fixed and rigid mounting means connected at least at opposite sides of the base member to said base member to rigidly support the base member, said base member having a plurality of separate opening means surrounded by the first material layer and spaced from each other and from the mounting means and establishing deflection of the base member in response to variation in said condition with the movement of said element being in a direction essentially normal to a plane through the mounting means, and said opening means controlling the deflection characteristic of the base member and said second layer.

8. The bi-material condition sensing apparatus of claim 7 wherein said plurality of separate opening means are located on a common circle and are equicircumferentially spaced on said circle.

9. The bi-material condition sensing apparatus of claim 8 wherein said openings are equal sized circular openings.

10. The bi-material condition sensing apparatus of claim 9 wherein said openings are sized to define a certain ratio of void and solid material on a circle line through the centers of said openings.

11. The bi-material condition sensing apparatus of claim 7 wherein said base member is a disc-like element and said second layer is co-terminus with said element, said mounting means being rigidly affixed to the peripheral edge of said base member, said opening means including a plurality of equicircumferentially spaced openings on a circle located in spaced relation to the peripheral edge.

12. The bi-material condition sensing apparatus of claim 11 wherein said openings are selected to define a certain ratio of void to solid material along the circle of the openings, said sensing apparatus having a zero sensitivity to said condition when said holes are located on a circle spaced from the peripheral edge and from said deflection being in opposite directions as said diameter location varies to the opposite side of said zero condition sensitivity diameter location.

13. The bi-material condition sensing apparatus of claim 7 wherein said base member is a circular plate having a center and said first and second material layers are co-terminus with respect to said base member and said mounting means is rigidly affixed to the peripheral edge of said base member and said second material layer, said opening means including a plurality of equicircumferentially spaced circular openings along a selected circle, the characteristic sensitivity of said sensor being controlled by the location of said circle and including a zero sensitivity to said condition at a ratio of the circle diameter to the base member diameter with the circle spaced from the mounting means and the center of the circular plate, said deflection being in opposite direction as said diameter ratio varies to the opposite side of said diameter ratio where zero sensitivity occurs and essentially in accordance with a straight line characteristic.

14. The bi-material condition sensing apparatus of claim 13 wherein said characteristic sensitivity is also controlled by the ratio of void to solid material defined by the openings and interconnecting solid material on the circle of the openings, and said openings are of a selected size to establish a selected characteristic.

15. The bi-material condition sensing apparatus of claim 7 wherein said base member is a substantially planar member and said second material layer is affixed to one surface of said base member.

16. The bi-material condition sensing apparatus of claim 15 wherein said base member is a disc-like element having the mounting means connected to the periphery, and said opening means being located between the mounting means and the center of the base member.

17. The bi-material condition sensing apparatus of claim 7 wherein said second material is secured to substantially less than the total area of said base member and is equally applied to the base member in a circular configuration to define a substantially planar bi-material element with said base member.

* * * * *